United States Patent
Macneille et al.

(10) Patent No.: US 7,444,240 B2
(45) Date of Patent: Oct. 28, 2008

(54) COLLISION AVOIDANCE SYSTEM HAVING GPS ENHANCED WITH OFDM TRANSCEIVERS

(75) Inventors: Perry Macneille, Lathrup Village, MI (US); Ronald Miller, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 721 days.

(21) Appl. No.: 10/849,743

(22) Filed: May 20, 2004

(65) Prior Publication Data

US 2005/0273258 A1 Dec. 8, 2005

(51) Int. Cl.
G06G 7/78 (2006.01)
G05D 1/02 (2006.01)

(52) U.S. Cl. .................. 701/300; 701/301; 701/213; 340/435; 340/903; 342/357.06; 342/357.08

(58) Field of Classification Search .............. 701/300, 701/213, 301; 340/901, 903, 435; 370/315; 704/E19.02, E15.01; 342/357.06, 357.08
See application file for complete search history.

(56) References Cited

U.S. PATENT DOCUMENTS

| | | | | |
|---|---|---|---|---|
| 3,778,823 | A * | 12/1973 | Sato et al. ............... | 342/72 |
| 5,479,173 | A * | 12/1995 | Yoshioka et al. .......... | 342/70 |
| 5,983,161 | A * | 11/1999 | Lemelson et al. .......... | 701/301 |
| 5,999,880 | A * | 12/1999 | Okada et al. ............... | 701/213 |
| 6,037,860 | A * | 3/2000 | Zander et al. ............... | 340/436 |
| 6,246,376 | B1 * | 6/2001 | Bork et al. ................. | 343/760 |
| 6,275,707 | B1 * | 8/2001 | Reed et al. ............... | 455/456.3 |
| 6,275,773 | B1 * | 8/2001 | Lemelson et al. .......... | 701/301 |
| 6,297,737 | B1 * | 10/2001 | Irvin ....................... | 340/571 |
| 6,480,144 | B1 * | 11/2002 | Miller et al. ................ | 342/72 |
| 6,567,374 | B1 * | 5/2003 | Bohnke et al. ............ | 370/203 |
| 6,726,297 | B1 * | 4/2004 | Uesugi ..................... | 375/260 |
| 6,983,027 | B2 * | 1/2006 | Seki et al. ................. | 375/316 |
| 7,106,271 | B1 * | 9/2006 | Friday ...................... | 343/853 |
| 7,209,831 | B2 * | 4/2007 | Hilliard et al. ............ | 701/301 |

(Continued)

FOREIGN PATENT DOCUMENTS

BR 200417707 A * 3/2007

(Continued)

OTHER PUBLICATIONS

Experimental characterization of the nonlinear behavior of RF amplifiers, Rolain, Y.; Van Moer, W.; Pintelon, R.; Schoukens, J.; Microwave Theory and Techniques, IEEE Transactions on, vol. 54, Issue 8, Aug. 2006 pp. 3209-3218, Digital Object Identifier 10.1109/TMTT.2006.879168.*

(Continued)

Primary Examiner—Cuong H Nguyen
(74) Attorney, Agent, or Firm—Frank MacKenzie

(57) ABSTRACT

An object relative status determination system (54) for a vehicle (52) includes an orthogonal frequency domain modulation (OFDM) transceiver (56) that generates an object range signal (83). The system (54) may also include a global navigation system (GNS) (58) that receives a satellite range signal (70). A controller (66) is coupled to the OFDM transceiver (56) and the GNS (58) and determines object information relative to the vehicle (52) in response to the object range signal (83) and the satellite range signal (70).

19 Claims, 8 Drawing Sheets

U.S. PATENT DOCUMENTS

| | | | |
|---|---|---|---|
| 7,382,274 B1 * | 6/2008 | Kermani et al. | 340/901 |
| 2005/0273258 A1 * | 12/2005 | MacNeille et al. | 701/300 |
| 2007/0200695 A1 * | 8/2007 | Almstrand et al. | 340/539.13 |

FOREIGN PATENT DOCUMENTS

| | | | | |
|---|---|---|---|---|
| GB | 2417864 | A | * | 3/2006 |
| JP | 2004104237 | A | * | 4/2004 |
| KR | 2006066024 | A | * | 6/2006 |
| KR | 2006125827 | A | * | 12/2006 |
| WO | WO 2005064816 | A1 | * | 7/2005 |
| WO | WO 2008005890 | A2 | * | 1/2008 |

OTHER PUBLICATIONS

Broadband MIMO-OFDM wireless communications, Stuber, G.L.; Barry, J.R.; McLaughlin, S.W.; Ye Li; Ingram, M.A.; Pratt, T.G.; Proceedings of the IEEE, vol. 92, Issue 2, Feb. 2004 pp. 271-294, Digital Object Identifier 10.1109/JPROC.2003.821912.*

Doppler and frequency-offset synchronization in wideband OFDM, Salberg, A.-B.; Swami, A.; Wireless Communications, IEEE Transactions on, vol. 4, Issue 6, Nov. 2005 pp. 2870-2881, Digital Object Identifier 10.1109/TWC.2005.858337.*

Optimal space-frequency Group codes for MIMO-OFDM system, Yao Chen; Aktas, E.; Tureli, U.; Communications, IEEE Transactions on, vol. 54, Issue 3, Mar. 2006 pp. 553-562, Digital Object Identifier 10.1109/TCOMM.2006.869781.*

P. Banelli, "Theoretical analysis and performance of OFDM signals in nonlinear fading channels," IEEE Trans. Wireless Commun., vol. 2, No. 2, pp. 284-293, Mar. 2003.*

R. Pintelon and J. Schoukens, System Identification: A Frequency Domain Approach. Piscataway, NJ: IEEE Press, 2001.*

J. Schoukens, T. Dobrowiecki, and R. Pintelon, "Parametric identification of linear systems in the presence of nonlinear distortions. A frequency domain approach," IEEE Trans. Autom. Contr., vol. 43, No. 2, pp. 176-190, Feb. 1998.*

I. Kollár, J. Schoukens, R. Pintelon, G. Simon, and G. Román, "Extension for the frequency domain system identification toolbox for MATLAB: Graphical user interface, objects, improved numerical, stability," in Proc. 12th IFAC Syst. Identification Symp., Santa Barbara, CA, Jun. 21-23, 2000, vol. 2, pp. 699-702.*

Unknown author, "Measurement of frequency response functions using periodic excitations, corrupted by correlated input/output errors," IEEE Trans. Instrum. Meas., vol. 50, No. 6, pp. 1753-1760, Jun. 2001, cited by others.*

Asia-pacific abstracts; Microwave and Wireless Components Letters, IEEE; vol. 11, Issue 12, Dec. 2001 pp. 508-571 Digital Object Identifier 10.1109/LMWC.2001.974560.*

Mobile Vehicle-to-Vehicle Narrow-Band Channel Measurement and Characterization of the 5.9 GHz Dedicated Short Range Communication (DSRC) Frequency Band;Lin Cheng; Henty, B.E.; Stancil, D.D.; Fan Bai; Mudalige, P.; Selected Areas in Communications, IEEE Journal on;vol. 25, Issue 8, Oct. 2007 pp. 1501-1516 Digital Object Identifier 10.1109.*

State of the Art and Research Challenges for VANETs; Jakubiak, J.; Koucheryavy, Y.; Consumer Communications and Networking Conference, 2008. CCNC 2008. 5th IEEE; Jan. 10-12, 2008 pp. 912-916; Digital Object Identifier 10.1109/ccnc08.2007.212.*

Vtcf07 and Wivec07 TOC; Vehicular Technology Conference, 2007. VTC-2007 Fall. 2007 IEEE 66th; Sep. 30, 2007-Oct. 3, 2007 pp. xxvii-xlviii ; Digital Object Identifier 10.1109/VETECF.2007.15.*

Topics in ad hoc and sensor networks—A tutorial survey on vehicular ad hoc networks; Communications Magazine, IEEE vol. 46, Issue 6, Jun. 2008 pp. 164-171; Digital Object Identifier 10.1109/MCOM.2008.4539481 .*

Wireless communications for vehicle safety: Radio link performance and wireless connectivity methods; Gallagher, B.; Akatsuka, H.; Suzuki, H.; Vehicular Technology Magazine, IEEE; vol. 1, Issue 4, Dec. 2006 pp. 4-24; Digital Object Identifier 10.1109/MVT.2006.343641.*

Introduction and Preliminary Experimental Results of Wireless Access for Vehicular Environments (WAVE) Systems; Xiang, Weidong; Richardson, Paul; Guo, Jinhua; Mobile and Ubiquitous Systems—Workshops, 2006. 3rd Annual International Conference on; Jul. 17-21, 2006 pp. 1-8; Digital Object Identifier 10.1109/MOBIQW.2006.361766.*

Diversity exploiting MIMO-OFDMA ranging; Jianqiang Zeng; Minn, H.; Information, Communications & Signal Processing, 2007 6th International Conference on; Dec. 10-13, 2007 pp. 1-5; Digital Object Identifier 10.1109/ICICS.2007.4449592.*

Comparison of Collision Avoidance Systems and Applicability to Rail Transport; Garcia, C.R.; Lehner, A.; Strang, T.; Rockl, M.; Telecommunications, 2007. ITST '07. 7th International Conference on ITS; Jun. 6-8, 2007 pp. 1-6; Digital Object Identifier 10.1109/ITST.2007.4295927.*

A Novel OFDMA Ranging Method Exploiting Multiuser Diversity; Jianqiang Zeng; Hlaing Minn; Global Telecommunications Conference, 2007. Globecom '07. IEEE; Nov. 26-30, 2007 pp. 1498-1502; Digital Object Identifier 10.1109/GLOCOM.2007.288.*

Dimensioning Wave-Based Inter-Vehicle Communication Systems for Vehicular Safety Applications; Sepulcre, Miguel; Gozalvez, Javier; Wireless Communication Systems, 2006. ISWCS '06. 3rd International Symposium on Sep. 6-8, 2006 pp. 312-316; Digital Object Identifier 10.1109/ISWCS.2006.4362310.*

Opportunistic Spectrum Multichannel OFDMA; Pawelczak, P.; Prasad, R.V.; Hekmat, R.; Communications, 2007. ICC '07. IEEE International Conference on; Jun. 24-28, 2007 pp. 5439-5444; Digital Object Identifier 10.1109/ICC.2007.901.*

A 94 GHz OFDM Frequency Scanning Radar for Autonomous Landing Guidance: Van Caekenberghe, K.; Brakora, K.F.; Sarabandi, K.; Radar Conference, 2007 IEEE; Apr. 17-20, 2007 pp. 248-253; Digital Object Identifier 10.1109/Radar.2007.374222.*

Mobile Vehicle-to-Vehicle Narrow-Band Channel Measurement and Characterization of the 5.9 GHz Dedicated Short Range Communication (DSRC) Frequency Band;Lin Cheng; Henty, B.E.; Stancil, D.D.; Fan Bai; Mudalige, P.;Selected Areas in Communications, IEEE Journal on; vol. 25, Issue 8, Oct. 2007 pp. 1501-1516; Digital Object Identifier 10.1109.*

Model development for the wideband expressway vehicle-to-vehicle 2.4 GHz channel; Acosta, G.; Ingram, M.A.; Wireless Communications and Networking Conference, 2006. WCNC 2006. IEEE; vol. 3, 0-0 0 pp. 1283-1288 Digital Object Identifier 10.1109/WCNC.2006.1696471.*

An endfire phased array used in Wireless Access for Vehicular Environments (WAVE); Zhijun Zhang,; Fei Liu,; Wenhua Chen,; Zhenghe Feng,; Weidong Xiang,; Microwave and Millimeter Wave Technology, 2008. ICMMT 2008. International Conference on vol. 1, Apr. 21-24, 2008 pp. 428-431; Digital Object Identifier 10.1109/ICMMT.2008.4540409.*

* cited by examiner

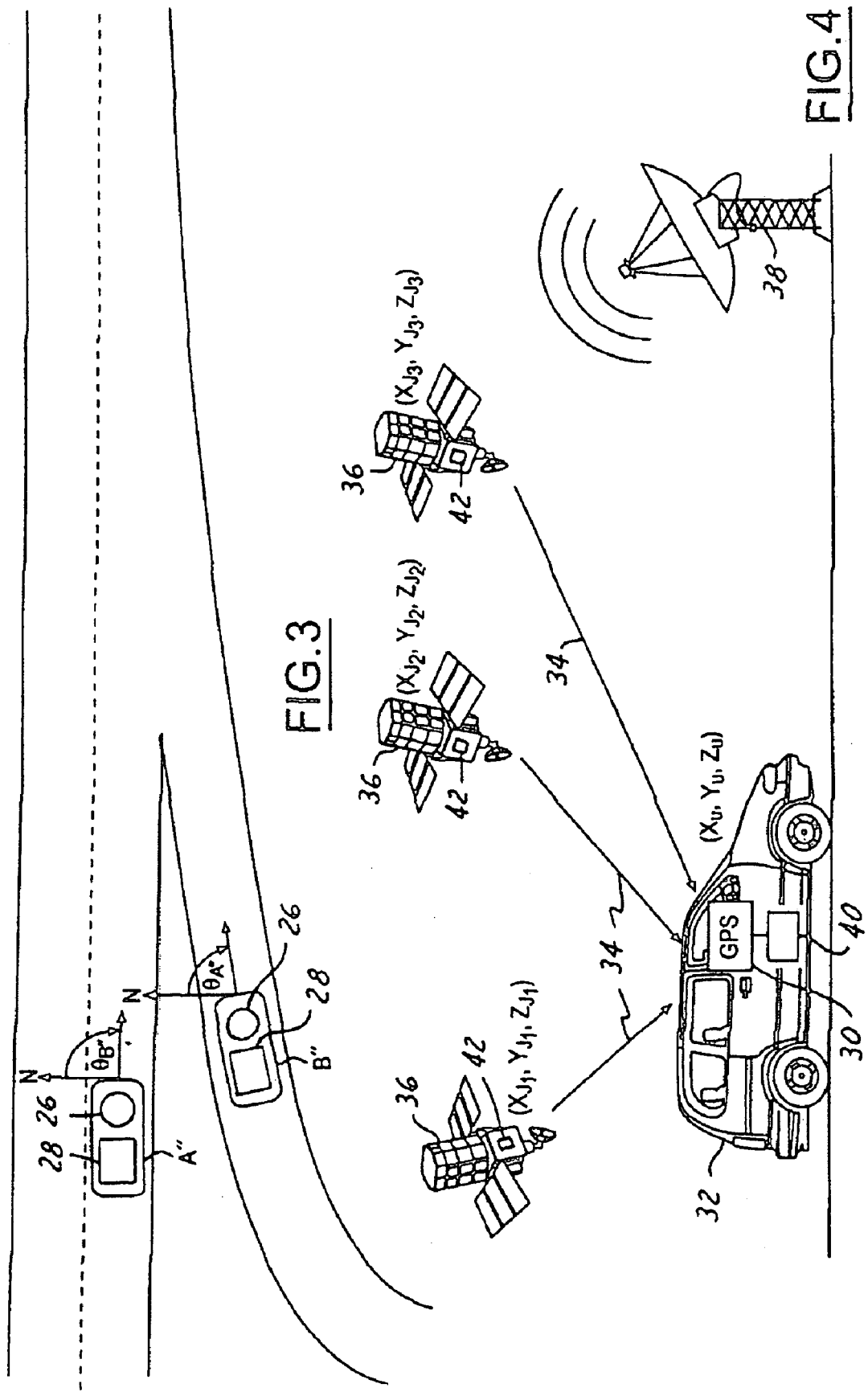

COLLISION AVOIDANCE SYSTEM HAVING GPS ENHANCED WITH OFDM TRANSCEIVERS

TECHNICAL FIELD

The present invention relates to collision warning, avoidance, and countermeasure systems for an automotive vehicle. More particularly, the present invention is related to systems and methods of determining positions and velocities of vehicles relative to each other.

BACKGROUND OF THE INVENTION

Collision warning, avoidance, and countermeasure systems are becoming more widely used. Collision warning systems are able to detect an object within proximity of a host vehicle and assess whether the object detected is an obstacle and poses a threat to the host vehicle. These systems also provide a vehicle operator knowledge and awareness of obstacles or vehicles within a close proximity in time such that the operator may perform actions to prevent colliding with the detected obstacles. Countermeasure systems exist in various passive and active forms. Some countermeasure systems are used in the prevention of a collision, and others are used in the prevention of an injury to a vehicle operator.

Collision warning systems may be forward or rearward sensing. These systems can indicate to a vehicle operator that an object, which may not be visible to the vehicle operator, is within a stated distance and location relative to the host vehicle. The vehicle operator may then respond accordingly. Other collision warning systems and countermeasure systems activate passive countermeasures such as air bags, load-limiting seat belts, or active vehicle control including steering control, accelerator control, or brake control whereby the system itself aids in preventing a collision or injury.

Many countermeasure systems require knowledge of locations and velocities of objects or vehicles that are proximate to a host vehicle. Global Navigation Systems (GNS), such as the United States Global Positioning System (GPS) and other similar systems that are based on similar principles, such as the Russian Federation Glasnost system, the People's Republic of China Beidou (Big Dipper) system, and the European Union Galileo system can provide this information, but frequently without the necessary accuracy.

A typical GPS vehicle scenario includes multiple vehicles equipped with GPS receivers that are coupled to onboard computers equipped with two-way digital radios for communications therebetween. Position, velocity, and time (PVT) data is computed in the GPS receivers and passed to the computers. The PVT data may be exchanged between the vehicles using the two-way radios, or through use of wireless modems or network devices. Several protocols are established for performing this exchange of PVT data, which includes Dedicated Short Range Communications (DSRC) and Institute of Electric and Electronics Engineers (IEEE) 802.11a specification protocols. A typical or normal GPS calculates PVT data using the time of travel of signals from a system of satellites to a GPS receiver. In this process many of the user errors attributable to GPS measurements are eliminated. However, the errors attributed to the GPS receivers cannot be eliminated by such a subtraction and the errors, as a result, are multiplied or amplified in determining position. The size of these errors is sensitive to the geometric relationship between GPS satellites being used.

Additionally, in using current GPSs, each vehicle's GPS must be able to receive signals from at least four satellites simultaneously for the proper functioning thereof. Buildings, overpasses, foliage, and terrain may limit the number of satellites that are "visible" to the receivers of a GPS. Thus, these limitations reduce the effectiveness of current GPSs in determining vehicle PVT data for the purposes of vehicle safety, navigation, and telematics.

Thus, there exists a need for an improved system for determining relative positioning and velocity data for an automotive vehicle that minimizes the above-stated errors and is not limited by the number of visible GPS satellites.

SUMMARY OF THE INVENTION

The present invention provides an object relative status determination system for a vehicle. The system includes an orthogonal frequency domain modulation (OFDM) transceiver that generates an object range signal. The system may also include a global navigation system (GNS) that receives a satellite range signal. A controller is coupled to the OFDM transceiver and the GNS and determines object information relative to the vehicle in response to the object range signal and the satellite range signal.

The embodiments of the present invention provide several advantages. One such advantage is the provision of communicating vehicle information with respect to a host vehicle utilizing orthogonal frequency domain modulation (OFDM) transceivers. In so doing, the stated embodiment aids in reducing the number of satellites that need to be visible while increasing the accuracy of measurements performed.

Another advantage provided by an embodiment of the present invention is the provision of an OFDM-based object information system that is self-contained and packaged to be easily installed or retrofitted into various vehicles.

Yet another advantage provided by an embodiment of the present invention, is the provision of an OFDM-based object information system that isin communication with other onboard vehicle systems, such as a navigation system; a telematics system; and a collision warning, avoidance, and countermeasure system.

The present invention itself, together with attendant advantages, will be best understood by reference to the following detailed description, when viewed in conjunction with the accompanying drawing figures.

BRIEF DESCRIPTION OF THE DRAWINGS

For a more complete understanding of the present Invention, reference should be made to the embodiments illustrated in greater detail in the accompanying drawing figures, and also described below by way of examples of the invention, wherein:

FIG. 3 is a top view of a sample vehicle-merging situation for a pair of vehicles each having a GPS and a two-way radio;

FIG. 4 is a sample position diagram for a GPS of a vehicle;

DETAILED DESCRIPTION OF THE PREFERRED EMBODIMENT

Figure 1:
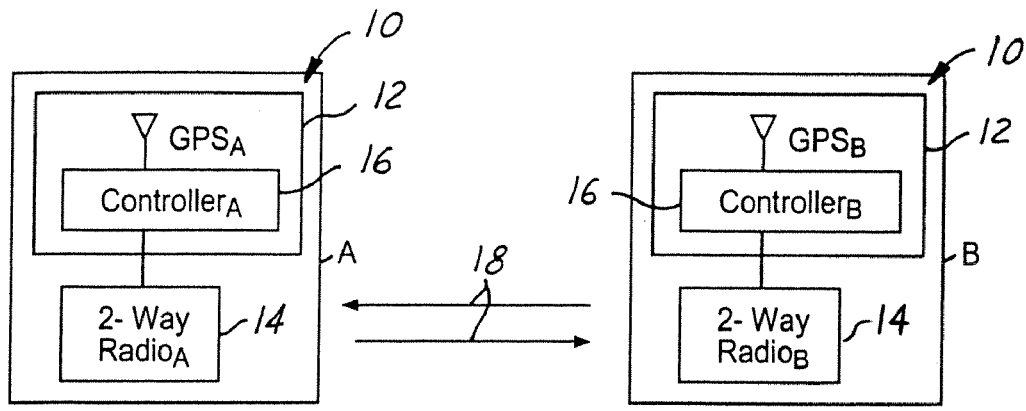
FIG. 1 is a block diagrammatic view of object relative information systems utilizing GPSs and two-way radios and applied to a vehicle situation.

GPS errors are normally categorized as either system errors or user errors. System errors are errors that arise from a GPS system itself. The system errors, for example, can include synchronization errors between satellites, synchronization errors with a central clock, inaccuracies in satellite PVT data, number of visible satellites at any given time, velocity and timing aspects within the satellites, and accuracy of the timing signal shape. Also, the relative position of the satellites affects geometric dilution of precision (GDOP), which amplifies range errors. Range errors refer to the distance between the satellites and the GPS receivers. Small angle between the range lines causes high GDOP. High GDOP refers to magnification in measurement errors in the length of the range lines due to the satellites being located near the horizon.

User errors are errors that can be minimized within the GPS receivers. User errors include receiver errors and environmental errors. Receiver errors are a result of circuit limitations of the receivers, such as thermal amplifier noise, receiver clock error, as well as errors due to signal processor sampling rates and simplifications of PVT calculations to accommodate available CPU power. Receiver errors can be minimized by the increased ability of a receiver to calculate PVT data in response to an increased number of satellite ranges or ranges from an increased number of satellites. At least four satellite ranges are needed to compute the four PVT unknowns, which are longitude, latitude, elevation, and time.

Some receiver errors can be reduced by averaging data from several receivers. However, a more effective method of reducing error is derived from reducing environmental errors when the relative position and velocity of two vehicles is desired. Environmental errors are caused by environmental factors that affect the signals transmitted by satellites. Environmental factors include multipath fading, reflected signals, blocked signals, spatial variance in atmospheric impedance, thermal noise added in the atmosphere, and jamming sources, such as Ultra-Wide Band (UWB) transmitters.

Many of the environmental factors are the same for two closely spaced vehicles. When relative PVT information is determined for the closely spaced vehicles through subtraction thereof, many of the environmental errors are cancelled.

The present invention not only minimizes receiver errors and environmental errors, it also minimizes system errors as is described in further detail below. Also, the present invention provides improved geometry of the range measurements, especially when satellites are not located near the horizon relative to a vehicle. Horizontal range information is derived from the time-of-flight of OFDM signals. Since the OFDM signals travel a short distance between vehicles, environmental factors are negligible. Also, the path that the OFDM signals travel is close to or approximately the same in length as the path that is measured, thus reducing the GDOP.

In the drawing figures discussed as follows, the same reference numerals will be used to refer to the same or similar type of components. While the present invention is described herein with respect to systems and methods of determining positions and velocities of vehicles relative to a host vehicle, it is to be understood that the present invention may also be adapted and applied to various systems including, for example, collision warning systems, collision avoidance, systems, parking aid systems, reversing aid systems, countermeasure systems, vehicle systems, navigation systems, telematic systems, Cooperative Adaptive Cruise Control Systems, or other systems that may require object position or velocity determination. The present invention may be applied in vehicles, such as cars, trucks, buses, and boats. The present invention may also be utilized in a portable format for use by bicyclists and pedestrians. The present invention may be applied to any application where proximity measurements are performed.

The present invention may also be utilized in stationary locations, such as at an intersection, a dock, a shopping mall, an urban canyon, or other stationary locations to supplement a standard GNS. The positioning algorithm of embodiments of the present invention is capable of operating with less than four visible satellites, which allows for use in low satellite visibility areas where GNS signals are blocked, some of which are mentioned above. Stationary OFDM based systems and pseudolites may be utilized as described below in providing this capability.

In the following description, various operating parameters and components are described for one constructed embodiment. These specific parameters and components are included as examples and are not meant to be limiting.

Also, in the following description the term "performing" may include activating, deploying, initiating, powering, and other terms known in the art that may describe the manner in which a passive countermeasure may be operated.

Additionally, in the following description the term "countermeasure" may refer to reversible or irreversible countermeasures. Reversible countermeasures refer to countermeasures that may be reset to their original form or used repeatedly without a significant amount of functional deficiency, which may be determined by a system designer. Irreversible countermeasures refer to countermeasures such as airbags that, once deployed, are not reusable.

Moreover, a countermeasure signal may include information pertaining to the above-stated reversible and irreversible countermeasures or may include other information, such as collision warning information. For example, the countermeasure signal may contain object detection information, which may be used to indicate to a vehicle operator the presence or close proximity of a detected object.

Referring now to FIG. 1, a block diagrammatic view of object relative information systems 10 utilizing GPSs 12 and two-way radios 14, as applied to a vehicle situation, is shown. Each of the GNSs or GPSs 12 includes a controller 16. The controllers 16 determine the approximate position(s) of vehicles A and B in a Cartesian coordinate system (not shown). GPSs, in general, indicate PVT data using the 1984 World Geodetic System (WGS84) or Universal Transverse Mercator (UTM) coordinates, which are readily converted to a flat Cartesian coordinate system. WGS84, UTM, and similar geodetic systems describe the coordinate system of the position and time values. Position, velocity, and time (PVT) data 18 is collected in the GPSs 12 and received by the controllers 16. This data may be collected from the GPSs 12 using National Marine Electronics Association (NMEA) communications standards. NMEA is used to determine the type of physical wire used, the type of signals that travel over the wire, the type of data encoding, and the type of data packet format. The PVT data 18 is exchanged between the vehicles A and B using the two-way radios 14. Although the two-way radios 14 are shown in FIG. 1, the PVT data 18 may be exchanged utilizing wireless modems or network devices, such as those that conform to the IEEE 802.11a or Dedicated Short Range Communications (DSRC) specifications.

Known position and velocity vectors of the vehicles A and B are subtracted to provide relative velocity vectors. The controllers 16 can determine whether the vehicles A and B are traveling such that they may potentially collide in response to the relative positions and velocities of the vehicles A and B. The controllers 16 may perform a countermeasure when there exists a high probability of vehicles A and B colliding.

Figure 2:
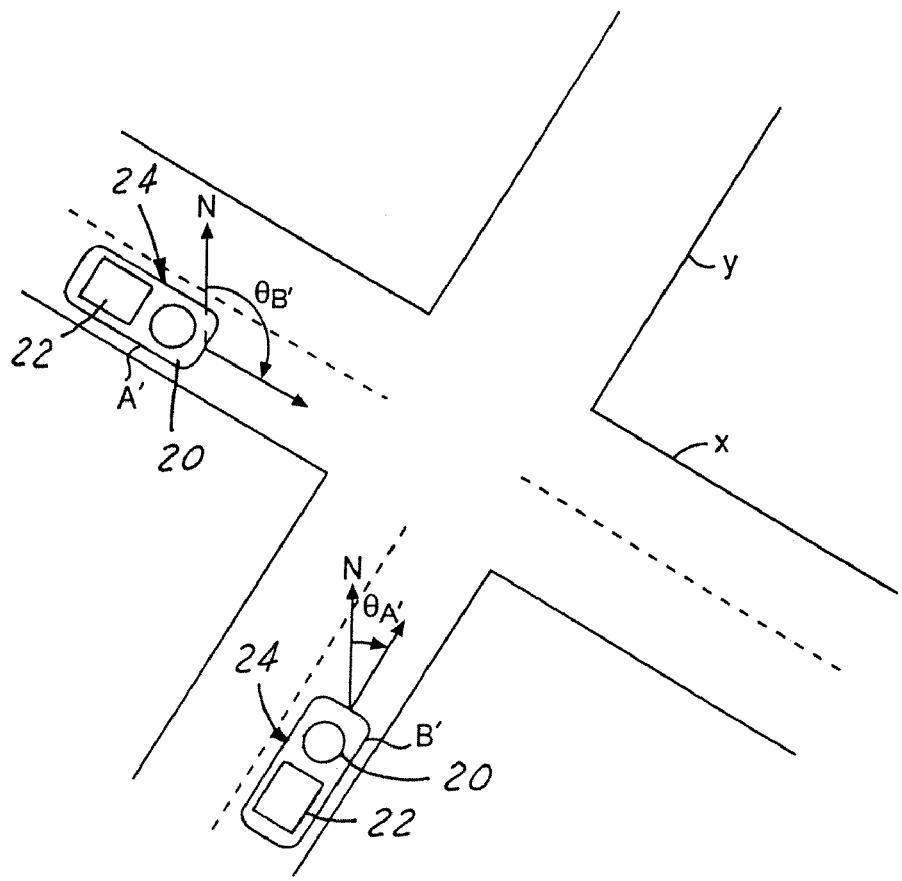
FIG. 2 is a top view of a sample vehicle intersection situation for a pair of vehicles each having a GPS and a two-way radio.

Referring now to FIG. 2, a top view of a sample vehicle intersection situation for a pair of vehicles A' and B' each having a GNS or GPS 20 and a two-way radio 22 are shown. The vehicles A' and B' have object relative information systems 24, such as those described above with respect to FIG. 1. The first vehicle A' is traveling in an eastward direction along roadway x. The second vehicle B' is traveling in a northbound direction along roadway y. Positions of the vehicles A' and B' may be determined utilizing equations 1-6, with reference to roadways x and y, where R is the-altitude of vehicle A' relative to the center of the earth, D is the distance between the vehicles A' and B', and BR is the bearing from vehicle A' to vehicle B'. Although equations 1-4 and 6 are shown with respect to vehicle A', the equations may be easily modified to be in respect to vehicle B'.

$$\theta = \frac{2\pi}{360}(\text{Latitude of vehicle } A' - \text{Latitude of vehicle } B') \quad (1)$$

$$\phi = \frac{2\pi}{360}(\text{Longitude of vehicle } A' - \text{Longitude of vehicle } B') \quad (2)$$

$$y = 2R\sin\left(\frac{\theta}{2}\right) \quad (3)$$

$$x = [\pi R \cos(\text{Latitude of } A')]\sin(\phi) \quad (4)$$

$$D = \sqrt{x^2 + y^2} \quad (5)$$

$$BR = \arctan\left(\frac{x}{y}\right) \quad (6)$$

Velocities of the vehicles A' and B' may be determined utilizing equations 7-8, where $\dot{x}$ is the relative velocity vector for vehicle A' and $\dot{y}$ is the relative velocity vector for vehicle B'. The bearings of vehicles A' and B' with respect to North as determined by the GPSs 20 are $\theta_A$ and $\theta_B$, respectively. The speeds of vehicles A' and B' as determined by the GPSs 20 are $S_A$ and $S_B$, respectively. The relative velocity vector between the vehicles A' and B' is $$\{\dot{x}, \dot{y}\}.$$

$$\dot{x} = S_{A'}\sin(\theta_{A'}) + S_{B'}\sin(\theta_{B'}) \quad (7)$$

$$\dot{y} = S_{A'}\cos(\theta_{A'}) + S_{B'}\cos(\theta_{B'}) \quad (8)$$

When the relative velocity vector $$\{\dot{x}, \dot{y}\}$$

is parallel with a bearing vector of one of the vehicles A' or B"then a collision may occur unless corrective actions are performed. The magnitude of the distance D divided by the magnitude of the velocity vector $$\{\dot{x}, \dot{y}\}$$

is approximately equal to the time to collision $T_c$ of the vehicles A' and B', which is represented by equation 9.

$$T_c = \left|\frac{\{x, y\}}{\{\dot{x}, \dot{y}\}}\right| \quad (9)$$

A collision factor C may be determined using equation 10. When C is equal to zero, vehicles A' and B' are traveling such that they may collide with each other.

$$C = \{x, y\} \times \{\dot{x}, \dot{y}\} = x\dot{y} - \dot{x}y \quad (10)$$

Although equations 1-10 are utilized above with respect to single vehicle situation, the equations may be applied to various other vehicle situations. For example, the equations may be applied to a vehicle-merging situation, as shown in FIG. 3. FIG. 3 is a top view of a sample vehicle merging situation for a pair of vehicles A" and B" each having a GPS 26 and a two-way radio 28, similar to that of vehicles A, A', B, and B' above.

Referring now to FIG. 4, a sample position diagram for a GNS or GPS 30 of an automotive vehicle 32 is shown. The GPS 30 determines the position of the vehicle 32 in response to satellite range signals 34 received from the satellites 36. The satellites 36 may include one or more pseudolites, such as the pseudolite 38. Pseudolites represent simulated satellites and may, for example, be in the form of a beacon. Pseudolites are utilized when some or all of the satellites 36 are not visible to the GPS 30. This may occur when the vehicle 32 is in a parking garage, under an overpass, or when portions of a building or foliage are obstructing communications between the satellites 36 and the GPS 30.

Position of the vehicle 32 may be determined using equations 11-13, where $P_J$ is the distance between satellite J and the GPS 30, where J is one of the satellites 36, c is the speed of light, $\Delta T$ is the amount of time for a signal to travel from satellite J and reach the GPS 30, t is the time difference between a GPS clock 40 and a satellite clock 42, and N is the number of satellites 36.

$$P_j = c\Delta T \quad (11)$$

$$P_j = \sqrt{(x_j-x_u)^2+(y_j-y_u)^2+(z_j-z_u)^2} + ct; \text{ for } j=1\ldots N \quad (2)$$

$$P_j = f(x_u, y_u, z_u, \Delta t) \quad (13)$$

The position of each satellite 36 is $x_J, y_J, z_J$. The position of the GPS 30 is $x_u, y_u, z_u$. Non-linear equation 13 may be solved using linearization of $f(x_u, y_u, z_u, \Delta t)$ and iteration, closed form solutions, or Kalman filtering as is known in the art.

Figure 5:
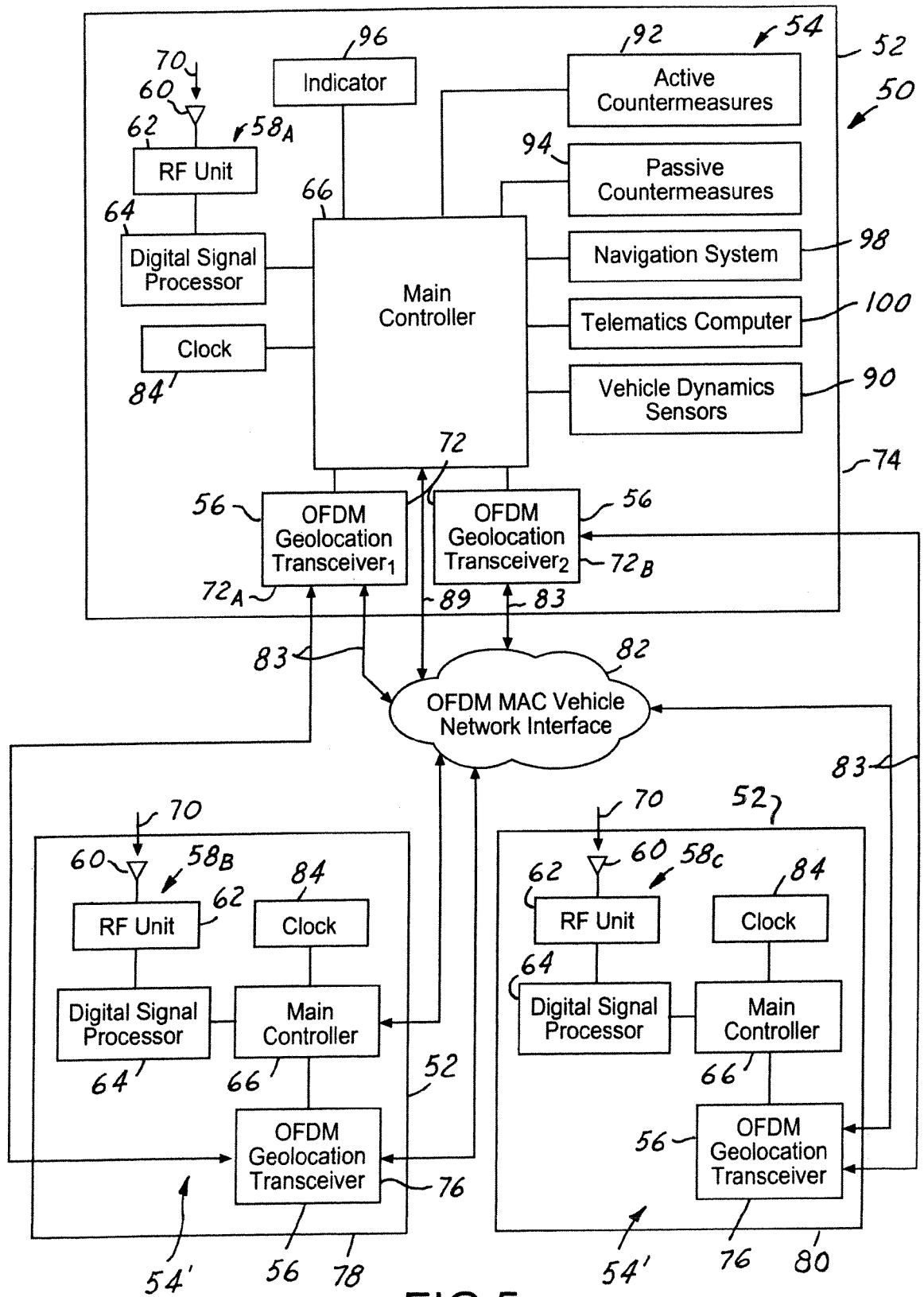
FIG. 5 is a block diagrammatic view of an OFDM-based object information system in accordance with an embodiment of the present invention.
Figure 7:
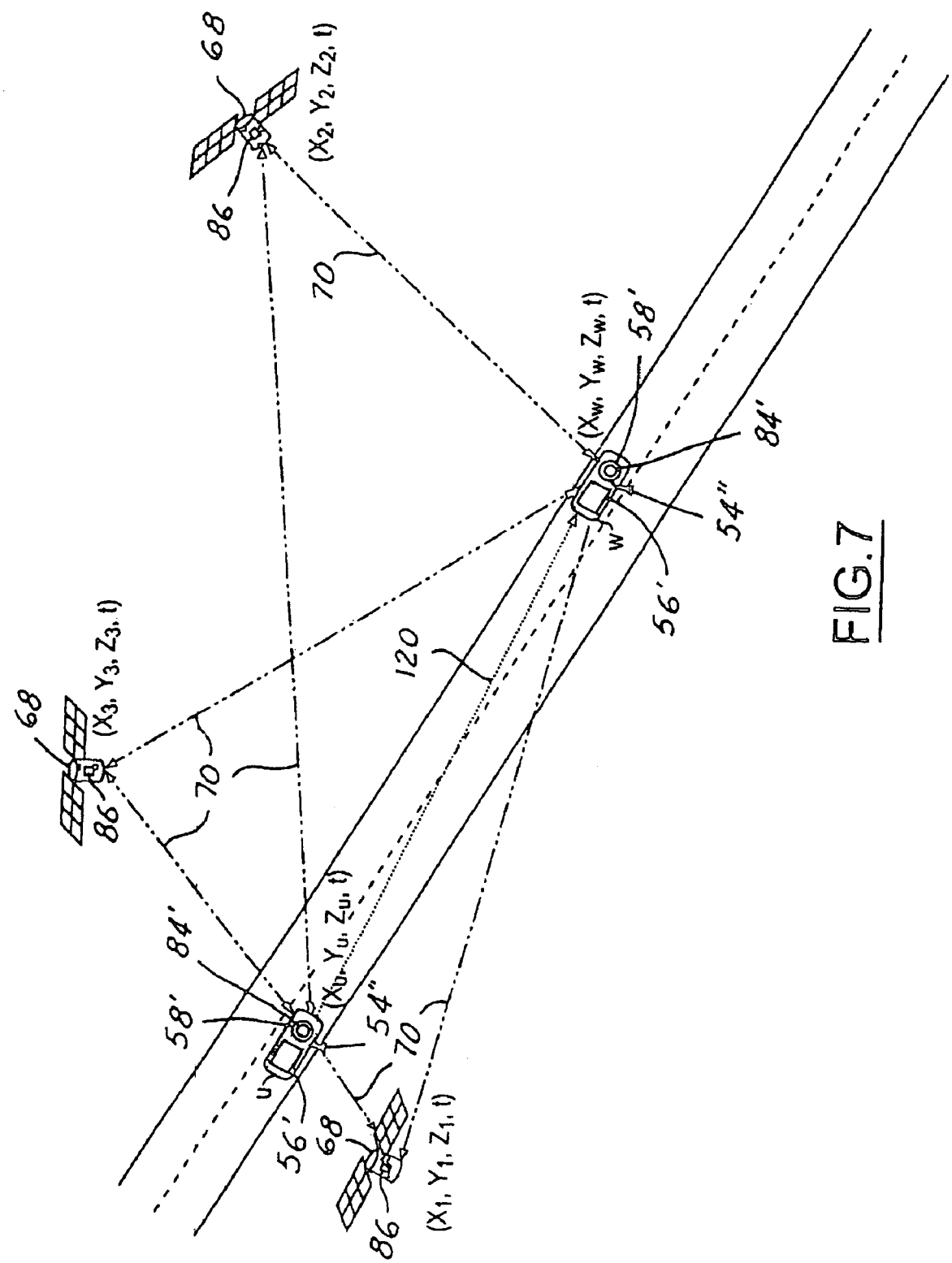
FIG. 7 is a sample position diagram for a pair of vehicles utilizing object relative status determination systems in accordance with an embodiment of the present invention.

Referring now to FIG. 5, a block diagrammatic view of an OFDM-based object information system 50, in accordance with an embodiment of the present invention, is shown. The OFDM-based system 50 includes multiple vehicles 52, each of which having an object relative status determination system 54 or 54', and each also having one or more OFDM transceivers 56. Each of the object systems 54 and 54' has a GNS or GPS 58 that includes a GPS antenna 60, a radio frequency (RF) unit 62, a digital signal processor (DSP) 64, and a main controller 66. The GPSs 58 are in communication with one or more satellites 68, which are best shown in FIG. 7. The satellites 68 may be replaced with one or more pseudolites, NAVSAT satellites, or the like. GPS signals or satellite range signals 70 are received by the GPS antenna 60 and the radio frequency units 62, are filtered and conditioned via the processors 64, and are utilized by the controllers 66 to determine the position of an associated vehicle.

The OFDM transceivers 56 are utilized to determine relative range and velocity of the vehicles with respect to each other, and also to communicate range, velocity, and PVT information used in the positioning calculation. Time-of-flight and Doppler shifts between OFDM transceivers are used in determining PVT information. For example, the OFDM transceivers 72 of a first or host vehicle 74 may communicate with the OFDM transceivers 76 of a second vehicle 78 and a third vehicle 80 to determine relative position and velocity of the second and third vehicles 78 and 80 relative to the host vehicle 74.

The OFDM transceivers, 56 are in communication via an OFDM Media Access Protocol (MAC) vehicle network interface 82. The OFDM interface 82 allows many mobile devices to interoperate in the same radio frequency band. The OFDM interface 82 utilizes an ad hoc mode whereby there is no hierarchy between mobile nodes. This is unlike that of a Bluetooth-type MAC, which operates under the constraint of frequency hopping and narrow band modulation and requires the use of Piconets and Scatternets in which nodes have master, slave, and master/slave functions. The OFDM transceivers 56 transmit and receive object range signals 83, as well as other signals, between each other via the vehicle network interface 82.

Each vehicle 52 may have any number of OFDM transceivers. In one embodiment of the present invention, a first OFDM transceiver $72_A$ is utilized for discovery services and a second OFDM transceiver $72_B$ is utilized for range and synchronization services. Discovery services may include the detection of vehicles, whereas the range and synchronization services may include the determination of relative range, range rate, and the synchronization of communication with detected vehicles.

The OFDM transceivers 56 are equipped for range finding, synchronization, and Doppler velocity measurements. The OFDM transceivers 56 are utilized in conjunction with the GPSs 58 to synchronize clocks 84 on each vehicle 52 with the clocks 86 on the satellites 68. Although the OFDM transceivers 56 and the GPSs 58 are shown as separate components they may be integrally formed into a single unit, such as a solid-state logic device, integrated logic chip, or a system-on-chip (SOC). The OFDM transceivers 56 and the GPSs 58 may be battery powered, powered by a vehicle power source, or may be externally powered.

Time synchronization can be achieved for a group of GPSs, when each GPS is coupled to a pair of OFDM transceivers, such as the. GPS 58A and transceivers 72. Each OFDM transceiver 72 has a direct connection to multiple neighbor or other OFDM transceivers in proximity therewith, such as OFDM transceivers 56. This creates a string or mesh topology network on which the synchronization is performed.

Synchronized time is computed as part of the PVT calculation. Four unknowns are calculated, the position in three spatial dimensions and the time of arrival of simultaneously transmitted timing signals from four objects having known positions. The timing signals may be GPS signals from satellites or OFDM signals from other vehicles or stationary OFDM based systems. The positions of the four objects are known and are transmitted as part of the timing signals. The PVT calculation may be improved through use of higher order time derivatives of position, such as that derived from acceleration and jerk. When position of less than four objects are known a PVT calculation may be performed, assuming a particular spatial value, such as the altitude or time, which may be extrapolated using an accurate clock.

Since the OFDM transceivers 56 are coupled to the GPSs 58, they can be utilized to support differential GPS, interferometric methods, such as carrier-phase differential GPS, and other GPS techniques known in the art. Also, since the GPSs 58 are wirelessly coupled via the OFDM transceivers 56, they may share ephemeris information, which can decrease time involved in the cold start process of the GPSs 58. For instance, when a GPS unit does not have current location information of NAVSAT satellites, download time to acquire such information may be approximately 12.5 to 25 minutes in length. The GPS on a first vehicle may receive the ephemeris data, via a first OFDM transceiver, from a second vehicle having a second OFDM transceiver in fractions of a millisecond.

The object systems 54 may also include various vehicle dynamic sensors 90, active countermeasures 92, passive countermeasures 94, an indicator 96, a navigation system 98, and a telematics computer 100, which may all electrically coupled to the controllers 66. The main controllers 66 may activate the countermeasures 92 and 94 or indicate to a vehicle operator various object and vehicle information, via the indicator 96, to prevent a vehicle collision and injury to vehicle occupants.

The main controllers 66 may be microprocessor based such as a computer having a central processing unit, memory (RAM and/or ROM), and associated input and output buses. The main controllers 66 may be a portion of a central vehicle main control unit, an interactive vehicle dynamics module, a restraints control module, a main safety controller, or may be a stand-alone controller as shown. The main controllers 66 may communicate therebetween via the OFDM transceivers 56, the vehicle network 82, the MAC interface, or a combination thereof, as is shown by signals 83 and 89.

The vehicle dynamics sensors 90 may include a transmission rotation sensor, a wheel speed sensor, an accelerometer, an optical sensor, or other velocity or acceleration sensors known in the art. The vehicle dynamic sensors 90 can be used to measure the dynamic state of the vehicle 74. This can be transmitted to other vehicles using the OFDM devices 56 and used to aid the PVT calculation.

Active countermeasures 92 may refer to the control of a brake system, a drivetrain system, a steering system, a chassis system control, or may refer to other active countermeasures known in the art.

The passive countermeasures 94 may refer to air bags, pretensioners, inflatable seat belts, a load limiting pedal and steering column, or may refer to other passive countermeasures and control thereof. Some other possible passive countermeasures that may be included are seatbelt control, knee bolster control, head restraint control, load limiting pedal control, load limiting steering control, pretensioner control, external airbag control, and pedestrian protection control.

Pretensioner control may include control over pyrotechnic and motorized seatbelt pretensioners. Airbag control may include control over front, side, curtain, hood, dash, or other type airbags. Pedestrian protection control may include controlling a deployable vehicle hood, a bumper system, or other pedestrian protective devices.

The indicator 96 is used to signal or indicate a collision-warning signal or an object identification signal in response to relative range or velocity information of nearby objects or vehicles. The indicator 96 may include a video system, an audio system, an LED, a light, global positioning system, a heads-up display, a headlight, a taillight, a display system, a telematic system or other indicator. The indicator 96 may supply warning signals, collision-related information, external-warning signals to objects or pedestrians located outside of the vehicle, or other pre and post collision information.

Figure 6:
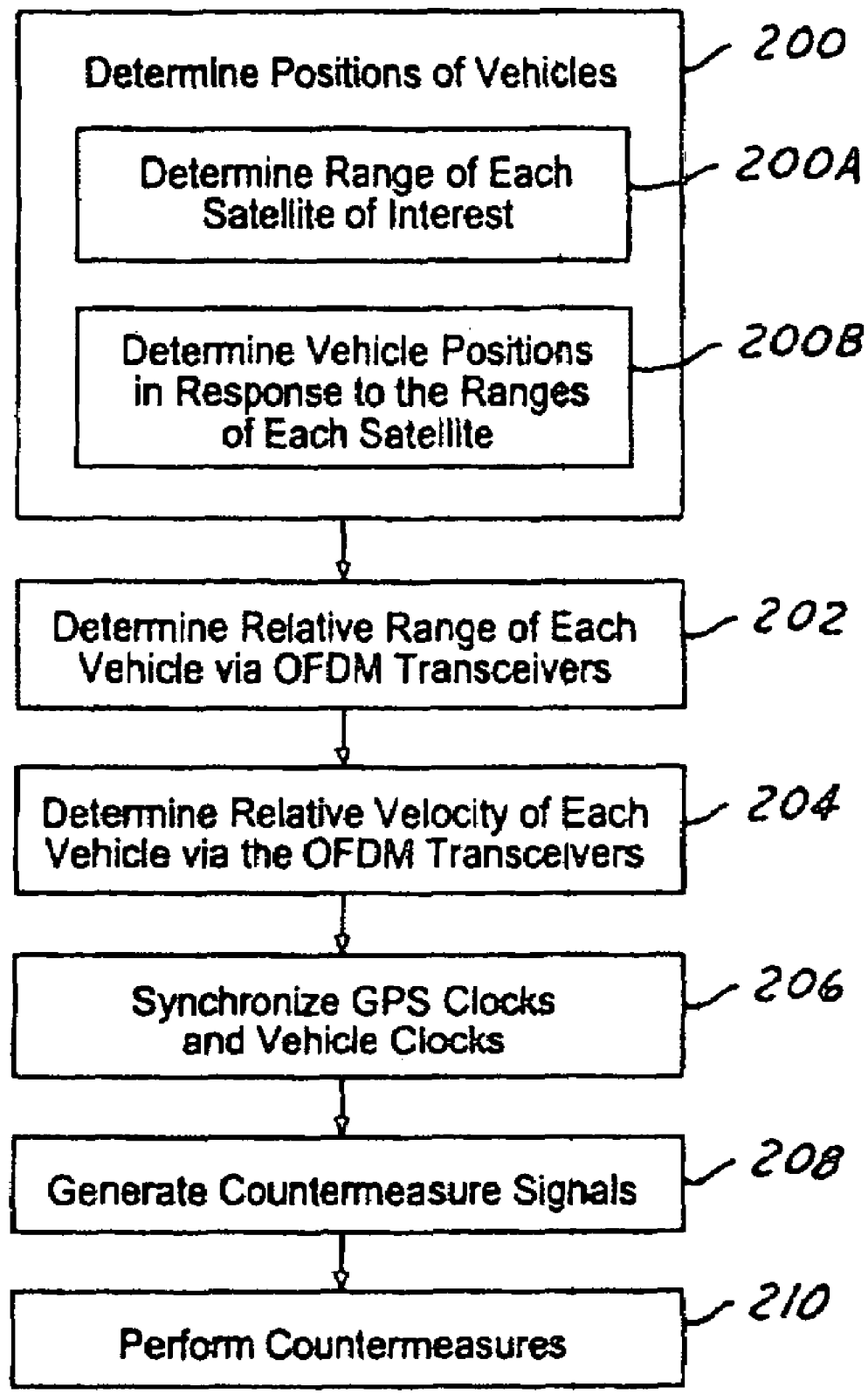
FIG. 6 is a logic flow diagram illustrating a method of determining object information relative to a vehicle in accordance with multiple embodiments of the present invention.

Referring now to FIGS. 6 and 7, a logic flow diagram illustrating a method of determining object information relative to a host vehicle U a sample position diagram for a pair of vehicles, including vehicle U and a vehicle W, are shown in accordance with multiple embodiments of the present invention. The vehicles U and W utilize object systems 54" that are similar to object systems 54.

In step 200, positions of the vehicles U and W are determined utilizing the GPSs 58'. In step 200A, the GPSs 58' receive satellite range signals 70 from the satellites 68 and in response thereto determine range of each satellite 68 of interest relative to each vehicle U and W. The satellite ranges $P_{JU}$ and $P_{JW}$ with respect to vehicles U and W, are determined utilizing equations 14-15, where as stated above J is one of the satellites 68, c is the speed of light and t is the time difference between the GPSs 58' or clocks therein. $P_{JU}$ is the distance between the satellite J and the vehicle U. $P_{JW}$ is the distance between the satellite J and the vehicle W.

$$P_{JU} = \sqrt{(x_J - x_U)^2 + (y_J - y_U)^2 + (z_J - x_U)^2} + ct = f(x_U, y_U, z_U, \Delta t);$$
$$\text{for } J = 1 \ldots N \quad (14)$$

$$P_{JW} = \sqrt{(x_J - x_W)^2 + (y_J - y_W)^2 + (z_J - z_W)^2} ct = f(x_X, y_W, z_W, \Delta t);$$
$$\text{for } J = 1 \ldots N \quad (15)$$

In step 200B, the positions of the vehicles $(x_U, y_U, z_U)$ and $(x_W, y_W, z_W)$ are determined in response to the ranges $P_{JU}$ and $P_{JW}$ using techniques known in the art.

In step 202, instead of the GPSs 58' determining positions, velocity, and time (PVT) information and transmitting the PVT information between the vehicles U and W as with the systems 10 of FIG. 1, the OFDM transceivers 56' are utilized to determine range of the vehicles U and W relative to each other. The OFDM transceivers 56' generate, transmit, and receive, vehicle-to-vehicle OFDM range signals or object range signals 120. Distance D between the vehicles U and W is determined using equation 16. Distance D is determined using OFDM time of flight measurements.

$$D = \sqrt{(x_U - x_W)^2 + (y_U - y_W)^2 + (z_U - z_W)^2} \quad (16)$$

In step 204, relative velocity of the vehicles U and W is determined by measuring the Doppler shift in the object range signals and using equations 17-19. As such, the rate of change in the ranges $P_{JU}$ and $P_{JW}$ and distance D are determined. $\dot{P}_{JU}$ is the time rate of change in the distance between the satellite J and the vehicle U. $\dot{P}_{JW}$ is the time rate of change in the distance between the satellite j and the vehicle W. $\dot{D}$ is the time rate of change in the distance between the vehicles U and W. The rate of change in distance $\dot{D}$ is determined by measuring the Doppler shift in the OFDM signal.

$$\dot{P}_{JU} = \sqrt{(\dot{x}_J - \dot{x}_U)^2 + (\dot{y}_J - \dot{y}_U)^2 + (\dot{z}_J - \dot{z}_U)^2} + c\dot{t}; \quad (17)$$
$$\text{for } J = 1 \ldots N$$

$$\dot{P}_{JW} = \sqrt{(\dot{x}_J - \dot{x}_W)^2 + (\dot{y}_J - \dot{y}_W)^2 + (\dot{z}_J - \dot{z}_W)^2} + c\dot{t}; \quad (18)$$
$$\text{for } J = 1 \ldots N$$

$$\dot{D} = \sqrt{(\dot{x}_U - \dot{x}_W)^2 + (\dot{y}_U - \dot{y}_W)^2 + (\dot{z}_U - \dot{z}_W)^2} \quad (19)$$

The velocities of the satellite J and the vehicles U and W are $(\dot{x}_U, \dot{y}_U, \dot{z}_U), (\dot{x}_U, \dot{y}_U, \dot{z}_U),$ and $(\dot{x}_W, \dot{y}_W, \dot{z}_W),$ respectively.

In step 206, the OFDM transceivers 56' also synchronize the clocks 84' of each of the GPSs 58'. The use of the OFDM transceivers 56' reduces the number of satellites that need to be visible. Since in general four ranges are needed to compute the PVT data, and since the OFDM based system 50 is capable of using OFDM ranging information from a nearby vehicle or from a stationary OFDM based system instead of from a satellite, the number of visible satellites required is reduced.

Steps 202-206 may be performed simultaneously. Other forms of equations 14-19 may be used. The ranges and velocities may also be determined using aid or information from other devices contained within the vehicles U and W that use the OFDM transceivers 56' and GPSs 58'. For example, navigation data, vehicle speed data, and accelerometer data may be used to improve the accuracy of the range and velocity calculations or to reduce the number of satellites visibly needed to perform the stated calculations.

In step 208, the main controllers of the systems 54", such as the controllers 66 of the systems 54, may generate countermeasure signals in response to the calculated relative ranges and velocities. In step 210, the main controllers may perform one or more countermeasure or warn a vehicle operator via an indicator, such as indicator 96 of FIG. 5, in response to the countermeasure signals.

The above-described steps are meant to be an illustrative example; the steps may be performed sequentially, synchronously, simultaneously, or in a different order depending upon the application.

Although the above method and the system are described in respect to an approaching or following type scenario, the above method and system may be utilized in various vehicle and object scenarios, such as merging scenarios, lane change scenarios, intersection scenarios, approaching head-on scenarios, following scenarios, and other scenarios known in the art.

Figure 8:
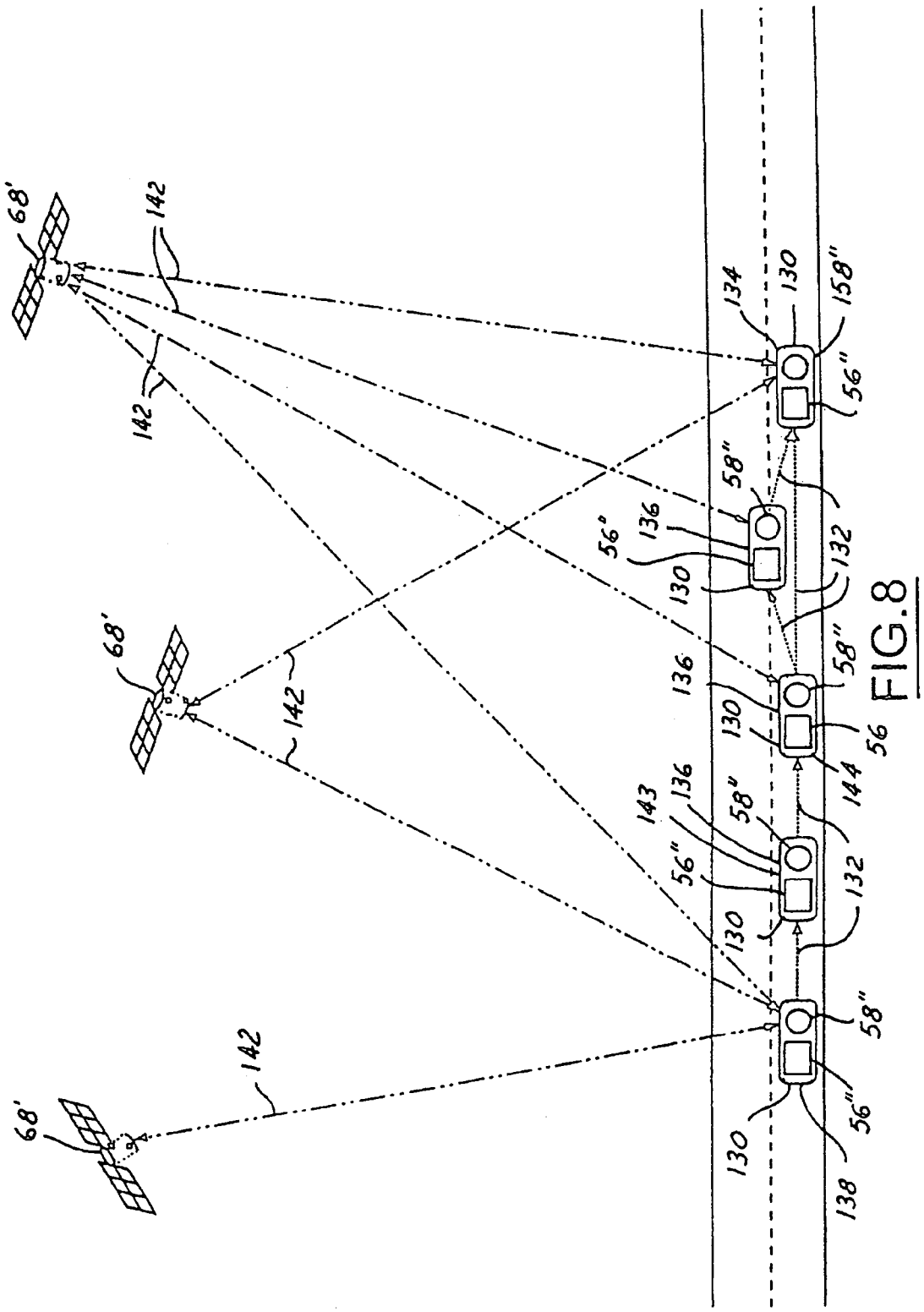
FIG. 8 is a sample position diagram for a series of vehicles utilizing a platooning method in accordance with an embodiment of the present invention.

Referring now to FIG. 8, a sample position diagram for a series of vehicles 130 utilizing a platooning method in accordance with an embodiment of the present invention is shown. The OFDM based system 50 may be utilized when joining a group of vehicles in a formation, such as a platoon. The term "platooning" refers to when vehicles move near one another such that there is little space between the vehicles and may also refer to the techniques utilized to determine relative positioning, range, and velocities of the vehicles therein. Platooning is used to reduce total wind drag or improve aerodynamics on a group of vehicles for improved fuel economy. Platooning also creates open spaces in traffic for vehicles to reside or pass therethrough, which aids in traffic congestion control.

To successfully platoon the vehicles 130, control algorithms are implemented to control the positioning and velocity of each of the vehicles 130. The vehicles 130 have OFDM links 132 therebetween.

In the platooning scheme as shown, the vehicles 130 include a head vehicle 134, multiple middle vehicles 136, and a tail vehicle 138. In the shown embodiment, instead of each vehicle 130 requiring four satellite-GPS links, one or more satellite-GPS links 142 are used per middle vehicle 136, two satellite-GPS links 142 are used for each of the head and tail vehicles 134 and 138. Vehicle 143 can be located from time and elevation data in addition to the ranging signals received from the middle vehicle 144 and the tail vehicle 138. Thus, vehicle 143 does not need to receive ranging signals from any of the satellites 68'. Vehicles 130 may receive timing and elevation data from neighboring vehicles or from the satellite-GPS links 142.

Also for the platooning scheme shown in FIG. 8, there are 6N+1 degrees of freedom or range, velocity, and time measurements for an N number of vehicles. Range and rate of change in range are measured by the OFDM transceivers 56" and by the GPSs 58". There are 3N range and velocity measurements and one time measurement performed. The OFDM transceivers 56" are used to synchronize the GPSs 58". The middle vehicles 136 need only have visible one satellite or pseudolite, since they have OFDM links 132 to a vehicle forward and rearward thereof, unless other information is provided as stated below. The head vehicle 134 and the tail vehicle 138 need a minimum of two satellites or pseudolites to be visible, unless other information is provided as stated below.

Figure 9:
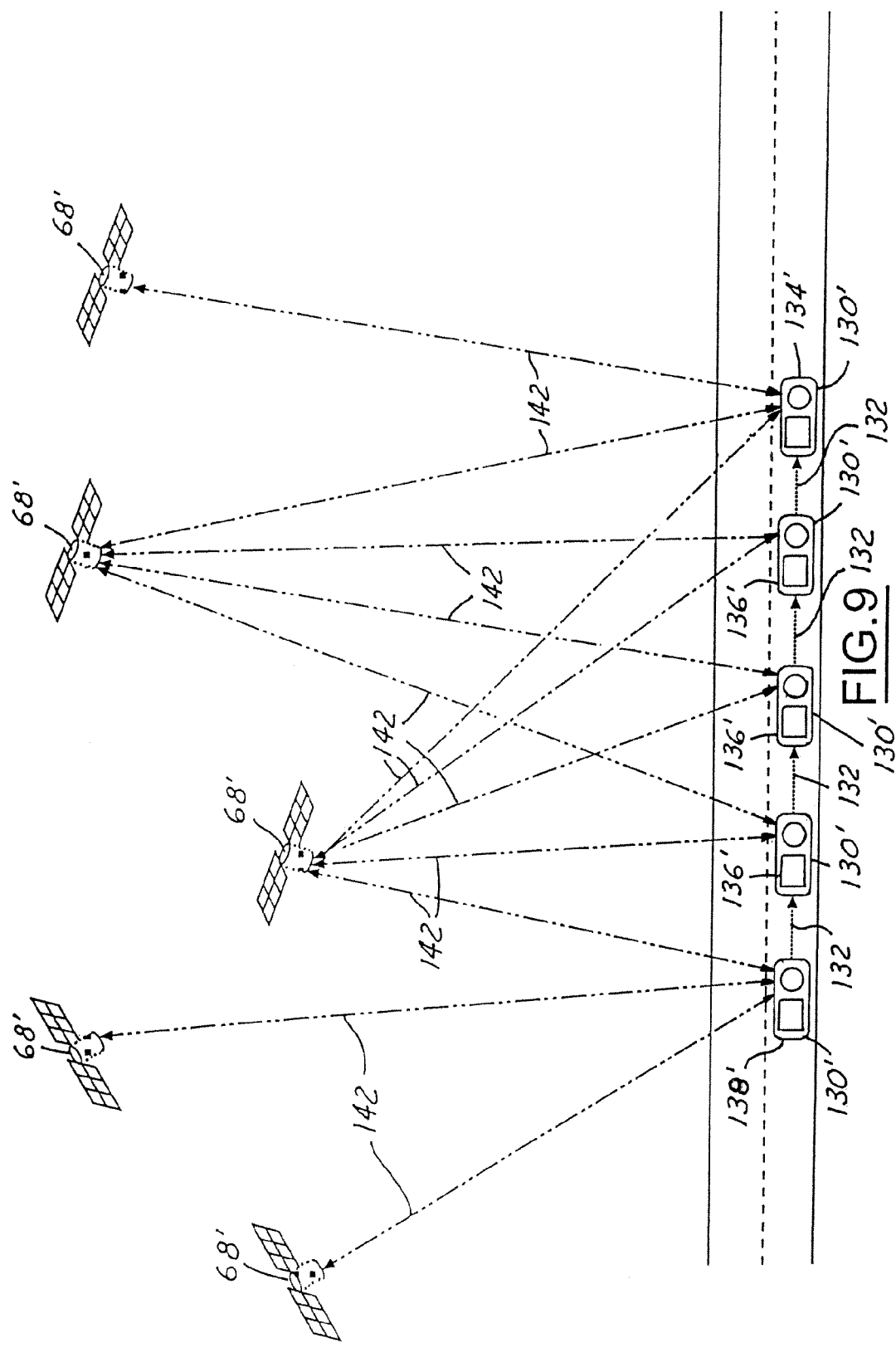
FIG. 9 is a sample position diagram for a series of vehicles utilizing another platooning method in accordance with another embodiment of the present invention.

Referring now to FIG. 9, another sample position diagram for a series of vehicles 130' utilizing another platooning method in accordance with another embodiment of the present invention is shown. Two satellite-GPS links 142 are used per middle vehicle 136', three satellite-GPS links 142 are used for the head vehicle 134' and the rear vehicle 138'. Vehicles 130' may receive timing and elevation data from neighboring vehicles via the OFDM links 132 or from the satellite-GPS links 142.

Other information and assumptions can be used in a platoon of vehicles to further reduce the number of satellite-GPS links and improve accuracy of the calculations, such as navigation data and velocity and acceleration data. For example, since it is generally known that a vehicle travels on the surface of the earth, vertical possible traveling planes or paths can be assumed or minimized and thus, satellite dependency can be reduced.

Figure 10:
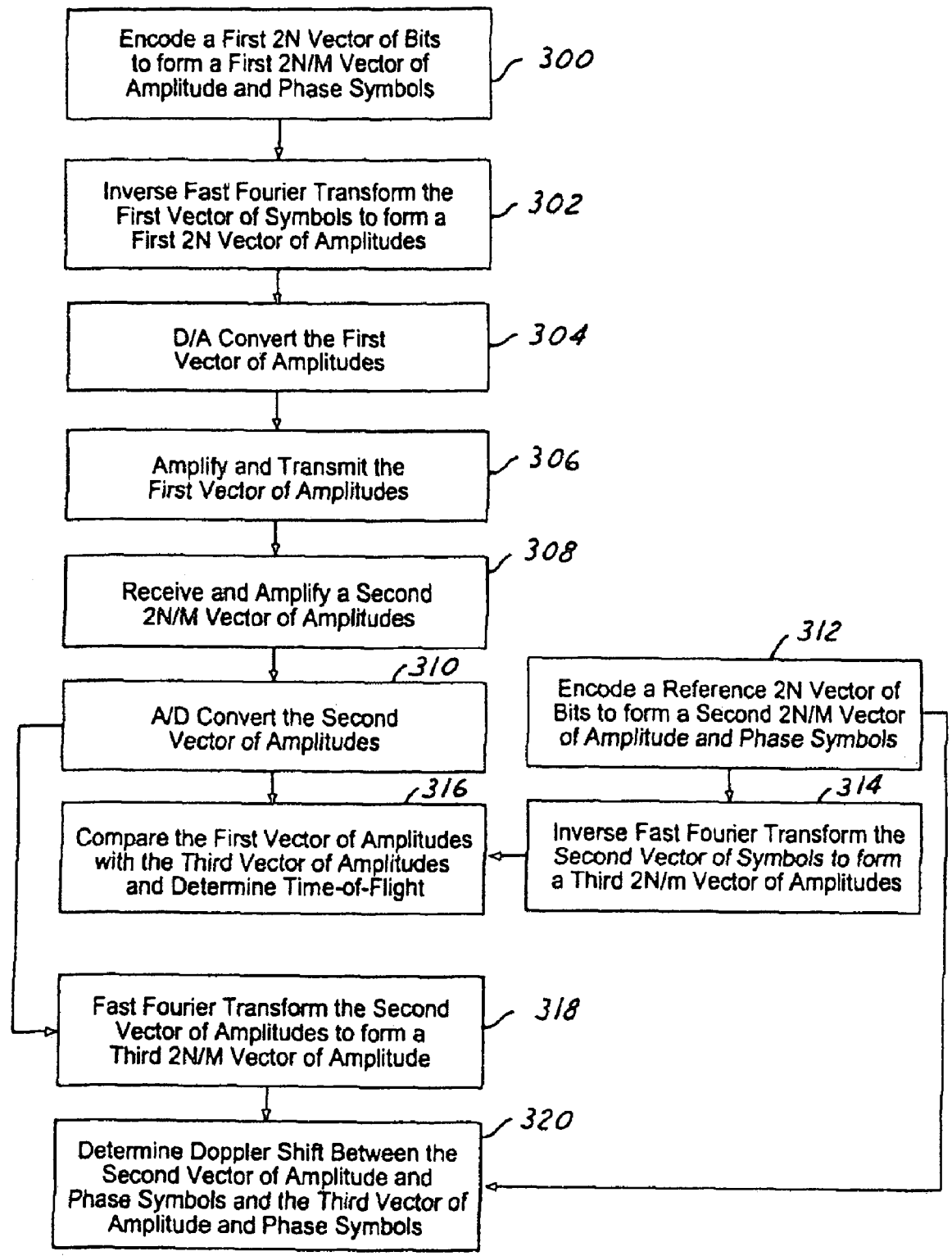
FIG. 10 is a sample logic flow diagram and block schematic illustrating an OFDM communication modulation scheme in accordance with an embodiment of the present invention.

Referring now to FIG. 10, a logic flow diagram and block schematic illustrating an OFDM communication modulation scheme in accordance with an embodiment of the present invention is shown.

In step 300, a first 2N vector of bits in a first known pattern are encoded into a first 2N/M vector of amplitude and phase symbols, where N is a pre-determined value and M is the number of elements in a symbol set. In step 302, an inverse Fast Fourier Transform is performed on the first vector of amplitude and phase symbols to form a first 2N/M vector of amplitudes. In step 304, the first vector of amplitudes is converted from a digital format to an analog format over a packet time interval.

In step 306, the analog formatted first vector of amplitudes is amplified and transmitted, via an OFDM transceiver, such as one of the transceivers 56. In step 308, a second analog formatted 2N/M vector of amplitudes is received and amplified. The second vector of amplitudes is the same as the first vector of amplitudes except that it has a time delay.

In step 310, the second vector of amplitudes is converted into a digital format over a packet time interval. In step 312, a reference 2N vector of bits having a second known pattern, similar to the first known pattern, is encoded into a second 2N/M vector of amplitude and phase symbols. The second vector of amplitude and phase symbols is similar to the first vector of amplitude and phase symbols. In step 314, the second vector of amplitudes and phase symbols are Fast Fourier Transformed into a third 2N/M vector of amplitudes.

In step 316, the digitally formatted second 2N/M vector of amplitudes is compared with the third 2N/M vector of amplitudes to determine time-of-flight. Time-of-flight information is determined for the transmitted signal or the transmitted first vector of amplitudes. As an example, amplitude peaks of the second and third vectors of amplitudes are compared, which may be referred to as OFDM packets, to determine the time delay between transmission and reception. The initial peak difference in amplitude between the second and third vectors of amplitudes provides an accurate time correlation. Of course, other methods may be utilized to determine time-of-flight.

In step 318, the second vector of amplitudes is Fast Fourier Transformed to form a third 2N/M vector of amplitudes and phase symbols. In step 320, the second vector of amplitudes and phase symbols is compared with the third vector of amplitudes and phase symbols in the frequency domain to determine the Doppler shift therebetween. The initial peak difference in power between the second and third vectors of amplitudes and phase symbols provides an accurate Doppler shift correlation.

The present invention provides an object relative status determination system that utilizes information from both a GPS and an OFDM transceiver. This combination reduces the dependency on visible satellites and improves accuracy of relative range and velocity measurements. The range, velocity, and synchronization provided with OFDM protocol reduce the number of required visible satellites and pseudolites while increasing the accuracy of PVT measurements. The status determination system is capable of accurately performing proximity measurements when signal paths are obscured. The status determination system also improves GPS data for vehicle navigation and other-purposes, as well as vehicle safety and pre-collision sensing. Since GPS and OFDM receivers detect system failures, fail over methods are easy to implement.

The relative status determination system in using OFDM provides decreased susceptibility to Doppler shift caused by the relative motion of mobile devices and to multipath fading. The highly packetized nature of OFDM provides accurate time-of-flight measurements. Since OFDM packets are transmitted over specific time intervals, the system can easily separate the Doppler effect from other interferences. The use of OFDM also allows for simple removal of noise from a signal, due to the use of pre-determined sets of orthogonal frequencies.

Since OFDM supports MAC protocols with connectionless datagram broadcast/multicast functionality, the system is able to provide a balanced network of nodes having the same function in the network. Thus, the present invention avoids segmentation of nodes within the network and allows for removal of nodes without the network collapsing or becoming inoperative. Also, in using a balanced network structure eliminates the need for continuous recalculation of the network structure, due to constant change in distance between nodes.

Through use of equal hierarchically ranked nodes, the system provides quick OFDM synchronization, which can be less than approximately 100 milliseconds.

While the present invention has been described in connection with one or more embodiments, it is to be understood that the specific mechanisms and techniques that have been described herein are merely illustrative of the principles of the invention, and that numerous modifications may be made to the methods and apparatuses described herein without departing from the spirit and scope of the invention as defined by the appended claims.

What is claimed is:

1. An object relative status determination system for at least one vehicle, said system comprising:
    at least one orthogonal frequency domain modulation (OFDM) transceiver operable to transmit and receive object range signals onboard a host vehicle; and
    at least one controller coupled to said at least one OFDM transceiver and operable to determine object information relative to said host vehicle in response to said object range signals.

2. An object relative status determination system as in claim 1, wherein said at least one controller is coupled to a vehicle network interface via said at least one OFDM transceiver.

3. An object relative status determination system as in claim 2, wherein said system comprises:
    a head vehicle having at least one onboard OFDM transceiver and at least one controller coupled thereto;
    at least one middle vehicle having at least one onboard OFDM transceiver and at least one controller coupled thereto; and
    a tail vehicle having at least one onboard OFDM transceiver and at least one controller coupled thereto;
    wherein said at least one controller of said head vehicle is coupled to said vehicle network interface via said at least one onboard OFDM transceiver of said head vehicle, said at least one controller of each said middle vehicle is coupled to said vehicle network interface via said at least one onboard OFDM transceiver of each said middle vehicle, and said at least one controller of said tail vehicle is coupled to said vehicle network interface via said at least one onboard OFDM transceiver of said tail vehicle;
    wherein said head vehicle, said at least one middle vehicle, and said tail vehicle are collectively in a platoon formation; and
    wherein said host vehicle is one of said head vehicle, said at least one middle vehicle, or said tail vehicle of said platoon formation.

4. An object relative status determination system for at least one vehicle, said system comprising:
    at least one OFDM transceiver operable to transmit and receive object range signals;
    at least one global positioning system (GPS) operable to receive satellite range signals; and
    at least one controller coupled to said at least one OFDM transceiver and said at least one GPS and operable to determine object information relative to a host vehicle in response to said satellite range signals and said object range signals.

5. An object relative status determination system as in claim 4, wherein said at least one OFDM transceiver particularly includes:
    a first OFDM transceiver onboard said host vehicle; and
    a second OFDM transceiver on an object.

6. An object relative status determination system as in claim 4, wherein said at least one GPS particularly includes:
    a first GPS onboard said host vehicle; and
    a second GPS on an object.

7. An object relative status determination system as in claim 4, wherein said at least one controller is particularly operable to determine the relative range of at least one object with respect to said host vehicle in response to said satellite range signals and said object range signals.

8. An object relative status determination system as in claim 4, wherein said at least one controller is particularly operable to determine the relative velocity of at least one object with respect to said host vehicle in response to said satellite range signals and said object range signals.

9. An object relative status determination system as in claim 4, wherein each of said at least one GPS includes:
    a GPS antenna;
    a radio frequency (RF) unit coupled to said GPS antenna; and
    a digital signal processor (DSP) coupled between said RF unit and said at least one controller.

10. An object relative status determination system as in claim 4, wherein said at least one controller is coupled to a vehicle network interface.

11. An object relative status determination system as in claim 10, wherein:
    said system further comprises a platoon of vehicles on which said at least one OFDM transceiver, said at least one GPS, and said at least one controller is carried; and
    said host vehicle is one of said platoon of vehicles.

12. An object relative status determination system as in claim 4, wherein said at least one GPS is particularly operable to receive said satellite range signals from a plurality of satellites.

13. An object relative status determination system as in claim 4, wherein said at least one GPS is particularly operable to receive said satellite range signals from at least one GPS satellite.

14. An object relative status determination system as in claim 4, wherein said at least one GPS is particularly operable to receive said satellite range signals from at least one navy navigation satellite system (NAVSAT) satellite.

15. An object relative status determination system as in claim 4, wherein said at least one controller is particularly operable to determine said object information relative to said host vehicle in response to a single one of said satellite range signals and a single one of said object range signals.

16. An object relative status determination system as in claim 4, wherein said at least one controller is particularly operable to determine said object information relative to said host vehicle in response to a plurality of said object range signals.

17. An object relative status determination system as in claim 4, wherein said at least one OFDM transceiver particularly includes:
    a first OFDM transceiver onboard said host vehicle; and
    a second OFDM transceiver on an object and in synchronization with said first OFOM transceiver.

18. A system comprising:

a host vehicle;

an orthogonal frequency domain modulation (OFDM) transceiver onboard said host vehicle;

a global positioning system (GPS) unit onboard said host vehicle;

at least one collision countermeasure onboard said host vehicle; and a controller coupled to said OFDM transceiver, said GPS unit, and said at least one collision countermeasure onboard said host vehicle;

wherein said OFDM transceiver is operable to transmit and receive range signals to and from at least one object having a reciprocal transceiver;

wherein said GPS unit is operable to receive range signals from at least one satellite that is wirelessly linked to said at least one object;

wherein said controller is operable to process said range signals and thereby determine the range of said at least one object relative to said host vehicle; and wherein said controller is operable to selectively control said at least one collision countermeasure according to said range as determined.

19. A system as in claim 18, wherein each said object is a separate vehicle having its own respective OFDM transceiver, GPS unit, and controller.

* * * * *